P. GOMMEL.
LATHE CENTER GRINDER.
APPLICATION FILED MAY 16, 1910.

966,826.  Patented Aug. 9, 1910.

Witnesses:
C. B. Knudsen
A. G. Peterson

Inventor:
Paul Gommel,
By Michael J. Stark & Sons,
Attorneys.

UNITED STATES PATENT OFFICE.

PAUL GOMMEL, OF CHICAGO, ILLINOIS.

LATHE-CENTER GRINDER.

966,826. Specification of Letters Patent. Patented Aug. 9, 1910.

Application filed May 16, 1910. Serial No. 561,638.

*To all whom it may concern:*

Be it known that I, PAUL GOMMEL, a subject of the Emperor of Germany, and resident of Chicago, in the county of Cook and State of Illinois, have invented certain new and useful Improvements in Lathe-Center Grinders; and I do hereby declare that the following description of my said invention, taken in connection with the accompanying sheet of drawings, forms a full, clear, and exact specification which will enable others skilled in the art to which it appertains to make and use the same.

This invention has general reference to improvements in lathe center grinders; and it consists, essentially, in the novel and peculiar combination of parts and details of construction, as hereinafter first fully set forth and described and then pointed out in the claim.

Figure 1:
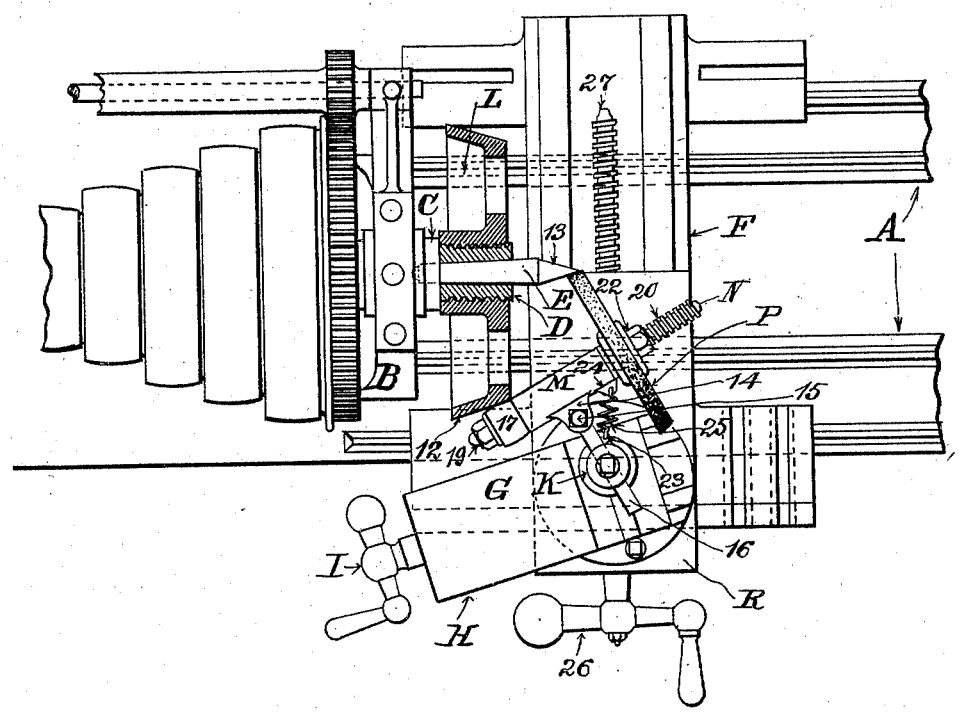
Figure 2:
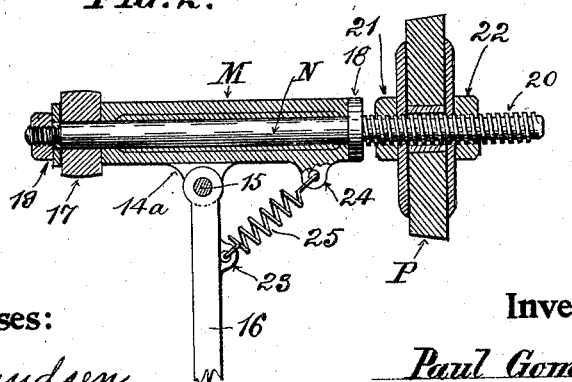

In the drawings already referred to, which serve to illustrate this invention more fully, Figure 1 is a plan, partly in section of a portion of an engine lathe fitted with my improved center grinder. Fig. 2 is a sectional plan view of the grinder detached.

The object of this invention is the production of an efficient, serviceable, and comparatively inexpensive attachment for engine lathes adapted for truing up the centers thereof.

In the drawings the character A designates the bed of an engine lathe, and B, the head stock thereof.

C designates the lathe spindle, and D the externally screw-threaded spindle nose thereof.

E is one of the lathe centers, of which there are usually two: one for the head stock and one for the tail stock, said centers being interchangeable.

F is the lathe carriage, and G the compound slide rest thereon.

H is the slide of the compound rest, and I, the ball handle by which the slide H is moved upon the rest.

K is the tool post located upon the slide H.

L designates the face plate which is in screw-threaded engagement with the lathe spindle nose D. This face plate has a comparatively wide rim 12, which is beveled on its periphery to correspond with the taper 13, of the lathe center E.

M indicates the grinder head. This head is a tube, in approximately the center of which there are two radially projecting lugs 14, 14ª, between which is pivoted, by a pivot bolt 15, a bar 16, of approximately the size of the turning tools used on said engine lathe, said bar being held in assembled position within the usual slotted tool post K. In this tubular head M revolves a spindle N, which carries at one end a friction pulley 17, suitably fastened to said spindle N, and when in use, in frictional contact with the tapering periphery of the face plate L. Near the opposite end of this spindle N there is a collar 18, bearing against the face of the tube M, said spindle N being prevented from laterally moving in said head by a tightening nut 19 and a washer at the outer end of said spindle N.

The end of the spindle N opposite that carrying the pulley 17 is externally screw threaded at 20, preferable with a so-called square thread, and upon this portion of said spindle there is placed an abrasive wheel P, such as an emery, corundum, carborundum or similar wheel, said wheel being secured upon said spindle by locking nuts 21, 22.

On the tool bar 16 there is formed a lug 23, and on the tube M there is provided a similar lug 24, wherewith engages a coil spring 25, as clearly shown in the figures.

In operation the grinding fixture is secured to the tool post K by its bar 16, and the compound rest of the lathe turned so that its slide H is in line with the taper of the rim of the face plate, and the carriage slide R run out sufficiently to permit the friction wheel 17 to engage this tapering rim. Now the carriage slide is run in until the face or periphery of the abrasive wheel comes in contact with the center to be trued up. The lathe is then started, preferably at its fastest speed when the friction wheel 17 will revolve the spindle N and the abrasive wheel thereon, the face plate L serving as the driver. By now revolving the ball handle I in the proper direction, the abrasive wheel P is moved laterally along the pointed portion 13 of the lathe center E and the latter trued up in an obvious manner.

The spiral spring 25 already mentioned, serves to keep the friction pulley 17 in contact with the periphery of the face plate, while by means of the ball handle 26 on the cross feed screw 27 of the carriage F, the carriage slide R, and with it the abrasive wheel P may be moved toward the center E to take additional cuts, and to compensate for wear of said abrasive wheel.

This latter wheel is laterally movable upon the screw-threaded portion of the grinder spindle N to compensate for varying lengths of the projecting portion of the lathe center E, said movement being accomplished by properly manipulating the locking nuts 21, 22, upon said spindle N.

It will now be observed that the cost of this attachment, especially in new installments, is comparatively low since the face plate L which is always furnished as a part of a lathe, does not increase the cost of the same, the only expense incurred being the cost of the attachment which is fastened to the tool post, and which can be installed and removed in a few moments of time.

Having thus fully described this invention, I claim as new and desire to secure to me by Letters Patent of the United States—

A center grinder for engine lathes, adapted for use in connection with a face plate, said face plate having a tapering peripheral rim, said taper corresponding to the taper of the center to be ground, a compound carriage, a tool post on said carriage, and a grinding device secured in said tool post, said grinding device including a tubular bearing, a tool bar to which said tubular bearing is pivoted, a spindle in said tubular bearing, a friction pulley at one end of said spindle adapted to engage the tapering periphery of said face plate, an abrasive wheel at the other end of said spindle, said abrasive wheel being laterally movable upon said spindle, and a spring connecting said tool bar to said tubular bearing, adapted to keep said friction pulley in operative engagement with the tapering periphery of said face plate.

In testimony that I claim the foregoing as my invention, I have hereunto set my hand in the presence of two subscribing witnesses.

PAUL GÖMMEL.

Witnesses:
 MICHAEL J. STARK,
 A. G. PETERSON.